United States Patent [19]
Halik et al.

[11] Patent Number: 5,325,401
[45] Date of Patent: Jun. 28, 1994

[54] L-BAND TUNER WITH QUADRATURE DOWNCONVERTER FOR PSK DATA APPLICATIONS

[75] Inventors: Gregory F. Halik, Del Mar; Stephen A. Blake; Itzhak Gurantz, both of San Diego, all of Calif.

[73] Assignee: Comstream Corporation, San Diego, Calif.

[21] Appl. No.: 850,544

[22] Filed: Mar. 13, 1992

[51] Int. Cl.$^5$ ............................................. H04L 27/22
[52] U.S. Cl. ....................................... 375/83; 375/81; 329/307; 331/99; 455/183.1
[58] Field of Search ......................... 375/80, 81, 83, 52, 375/97, 54; 329/306, 307; 455/183.1, 183.2, 209, 205, 300, 301, 302; 331/99, 96

[56] References Cited

U.S. PATENT DOCUMENTS

| | | | |
|---|---|---|---|
| 4,180,779 | 12/1979 | Hook et al. | 329/307 |
| 4,910,467 | 3/1990 | Leitch | 375/83 |
| 4,998,077 | 3/1991 | Nanni et al. | 331/99 |
| 5,020,147 | 5/1991 | Okanobu | 455/302 |
| 5,126,682 | 6/1992 | Weinberg et al. | 375/83 |

*Primary Examiner*—Stephen Chin
*Assistant Examiner*—Don Vo
*Attorney, Agent, or Firm*—Townsend and Townsend Khourie and Crew

[57] ABSTRACT

L-band tuner stage is combined with a quadrature downconverter stage in a single shielded enclosure as an L-band-to-baseband PSK tuner suitable for receiving L-band signals from an LNB and converting the signals directly to signals in a desired digital format. The bandwidths within the two stages are optimized for digital PSK demodulation, and certain functions are shared, such as automatic gain control and carrier tracking information. Electronically switchable attenuators and voltage-variable gain controlled amplifiers, in connection with a low-phase-noise local oscillator employing a microstrip resonator, provide for over 70 dB of dynamic range. The IF frequency and bandwidth are selected so that voltage-variable tunable bandpass filters of conventional design may be used to obtain over 40 dB of radio frequency (RF) image rejection necessary for reception of PSK signals. The IF signal from an L-band tuner stage is passed to the quadrature downconverter stage within the same enclosure, where the signal is split, and an IF local oscillator signal is injected into double balanced mixers to mix with the IF output of the L-band downconverter stage. The output of the mixers is the desired baseband I and Q data signals for PSK demodulation, which is fed directly to a PSK demodulator stage, which may also be a part of the same unit.

12 Claims, 3 Drawing Sheets

L-BAND TUNER WITH QUADRATURE DOWNCONVERTER FOR PSK DATA APPLICATIONS

BACKGROUND OF THE INVENTION

This invention relates to satellite receivers and more specifically, to satellite-to-home direct broadcast receiver systems for reception of digitally modulated information.

It is contemplated that digital television services and digital audio services will be digitally modulated when broadcast over satellite. In particular, a digital modulation scheme now in use is a phase shift keyed (PSK) modulation scheme. Heretofore, direct broadcast system television services have employed primarily analog modulation schemes for both video and audio information using a variety of low-cost satellite dishes, and low-noise-block (LNB) downconverters. The LNB downconverters provide conversion of the analog signals to frequencies in the L band, as well as amplification of signals for delivery to the indoor unit (IDU), for feed-in to the television unit. In known indoor units, the analog signal from the LNB is fed to a separate L-band downconverter, which in turn down-converts the signal into an intermediate frequency (IF) signal. The IF signal is then demodulated to produce an analog television signal. In a separate technology, digitally-modulated satellite signals are received by a satellite receiving dish and sent to a low-noise downconverter (LNB) for conversion to frequencies in the L band. The indoor unit for digital reception provides a signal through an L-band data downconverter which is down-converted to an IF signal. However, the IF signal, which is a PSK-modulated signals, must be sent to a quadrature downconverter which down-converts the PSK signal to baseband and then outputs two signals in quadrature, one in-phase and one out-of-phase (I and Q). The I and Q signals are then sent to a PSK demodulator which outputs the digital data.

While current satellite receiving dishes, LNBs and certain cabling can be used for digital television services, the current low-cost direct broadcast L-band downconverters cannot be used for PSK modulated signals. The L-band downconverters suffer from poor oscillator phase noise due to low synthesizer loop bandwidth in the internal phase locked loop circuits. In addition, there is insufficient dynamic range within such downconverters since FM video signals operate at fixed power levels, unlike PSK data signals. Finally, there is insufficient image rejection for PSK data reception.

There are available a number of L-band data downconverters and quadrature downconverters for use in specialized low volume applications. However, such downconverters are prohibitively expensive and not well-adapted for use for consumer digital television and digital radio. For example, such downconverters require numerous manual adjustments which are not readily automated. What is therefore needed is a low-cost L-band downconverter or downconverter combination suitable for direct broadcast services for consumer applications.

SUMMARY OF THE INVENTION

According to the invention, an L-band tuner stage is combined with a quadrature downconverter stage in a single shielded enclosure as an L-band-to-baseband PSK tuner suitable for receiving L-band signals from an LNB and converting the signals directly to signals in a desired digital format. The parameters within the two stages are optimized for digital PSK demodulation, and certain functions are shared, such as automatic gain control and carrier tracking information. Electronically switchable attenuators and voltage-variable gain controlled amplifiers provide for over 70 dB of dynamic range. A low phase noise synthesizer employing a microstrip resonator VCO provides a high quality local oscillator with good microphonic performance. The IF frequency and bandwidth are selected so that voltage-variable tunable bandpass filters of conventional design may be used to obtain over 40 dB of radio frequency (RF) image rejection. The IF signal from an L-band tuner stage is passed to the quadrature downconverter stage within the same enclosure, where the signal is split, and an IF local oscillator signal is injected into double balanced mixers to mix with the IF output of the L-band downconverter stage. The output of the mixers is the desired baseband I and Q data signals for PSK demodulation, which is fed directly to a PSK demodulator stage, which may also be a part of the same unit. Low-pass filters are used to remove local oscillator leakage and provide channel filtering. Bandwidths of the quadrature downconverter local oscillator phase locked loop stage and of the IF filter are sufficient to permit relatively-large frequency deviations without impact on PSK data demodulation.

The invention will be better understood by reference to the following detailed description in connection with the accompanying drawings.

DESCRIPTION OF SPECIFIC EMBODIMENTS

Figure 1:
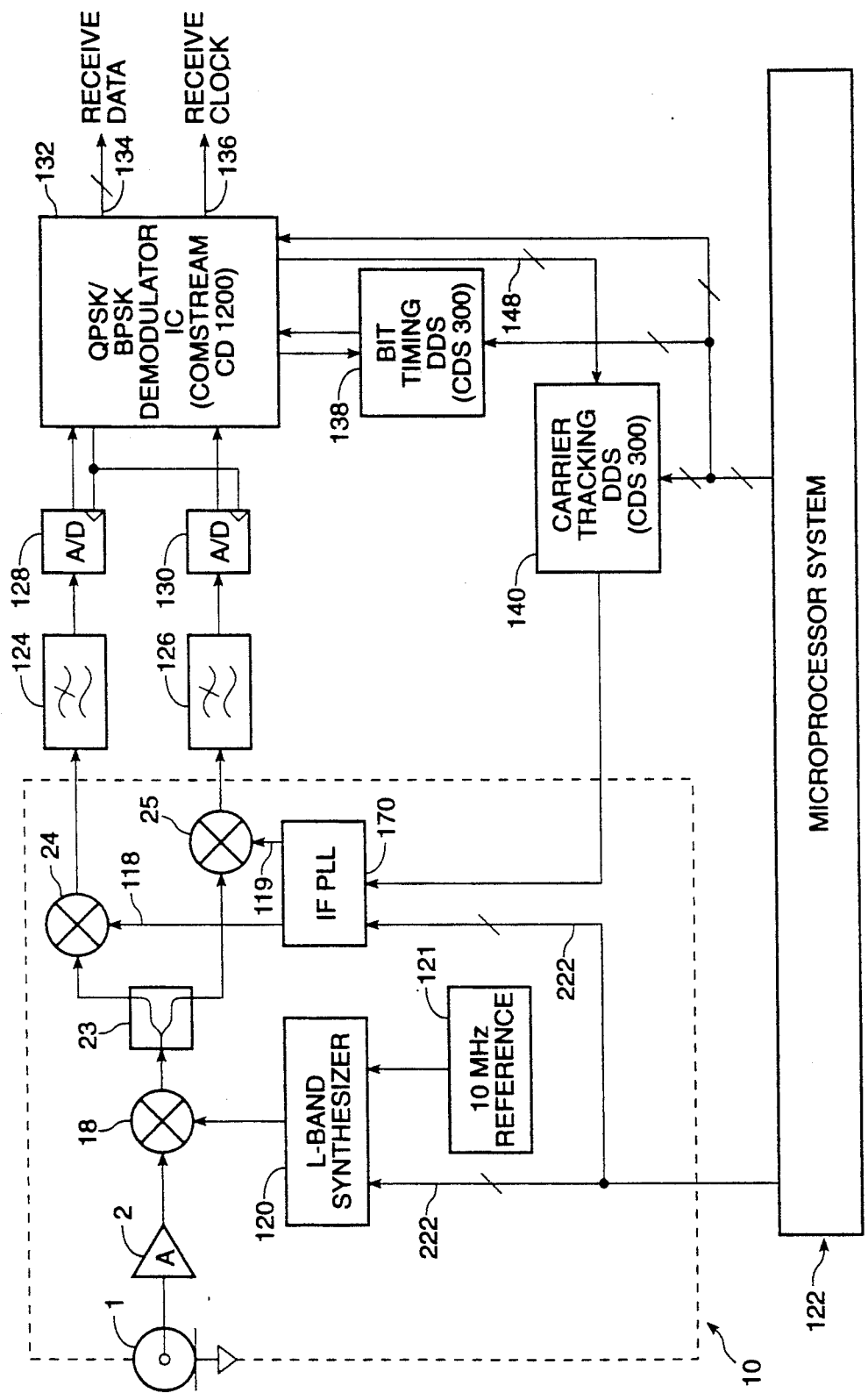
FIG. 1 is a block diagram of an L-band PSK tuner according to the invention.

Referring to FIG. 1, there is shown a PSK tuner 10 according to the invention, together with a microprocessor system 122. The device 10 is provided with an input port 1, such as a conventional F-type RF connector for connection to a coaxial cable (not shown) to receive a feed within the L frequency band from an outdoor unit such as the low noise block (LNB) unit (not shown) associated with a satellite dish (not shown). The L-band signal in the frequency range 950 MHz to 1700 MHz is passed through an amplifier 2 and thence to a mixer 18, where the analog L-band signal is mixed with the synthesized analog output signal of a digitally-controlled L-band synthesizer 120. The L-band synthesizer 120 is in a specific embodiment under tuning control of a microprocessor system 122, whose purpose is to provide tuning increment values via signal lines 222 for elements of the L-band synthesizer and an IF PLL 170 as hereafter explained. In a simplified apparatus, other tuning mechanisms may be provided, including tuning signals from an associated digitally-controlled receiver. The microprocessor system 122 is thus not a necessary component of a PSK tuner in accordance with the invention.

The L-band synthesizer 120 has as input a stable, fixed-frequency reference, such as a 10 MHz frequency reference 121, which is used in connection with the tuning input.

The mixer 18 produces an output signal which is split in a splitter 23 and fed into double-balanced mixers 24 and 25. An IF Phase Locked Loop (IF PLL) 170 feeds synthesized In-phase (I) and quadrature phase (Q) reference signals 90 degrees out of phase with one another to the mixers 24 and 25 through signal lines 118 and 119. Low-pass filters 124 and 126 filter the respective baseband outputs of the mixers 24 and 25, and analog to digital converters (A/D) 128, 130 convert the analog baseband signals to digital words to supply a PSK digital demodulator 132, which is preferably a standard integrated circuit (IC). One such circuit is a Type CD 1200 QPSK/BPSK Demodulator from ComStream Corporation of San Diego, California. The output is a stream of digital receive data, decoded in either BPSK or QPSK format, delivered on data lines 134 and a receive clock on clock line 136. The demodulator IC 132 may receive control signals from the microprocessor system 122 and generate frequency/phase control signals for a bit timing direct digital synthesizer (DDS) subsystem 138, as well as carrier tracking reference signals over a carrier tracking control line 148 for a carrier tracking DDS 140 coupled to the IF PLL 170. The DDS 138 and 140 may be Type CDS 300 integrated circuits available from ComStream Corporation of San Diego,. California.

Figure 2:
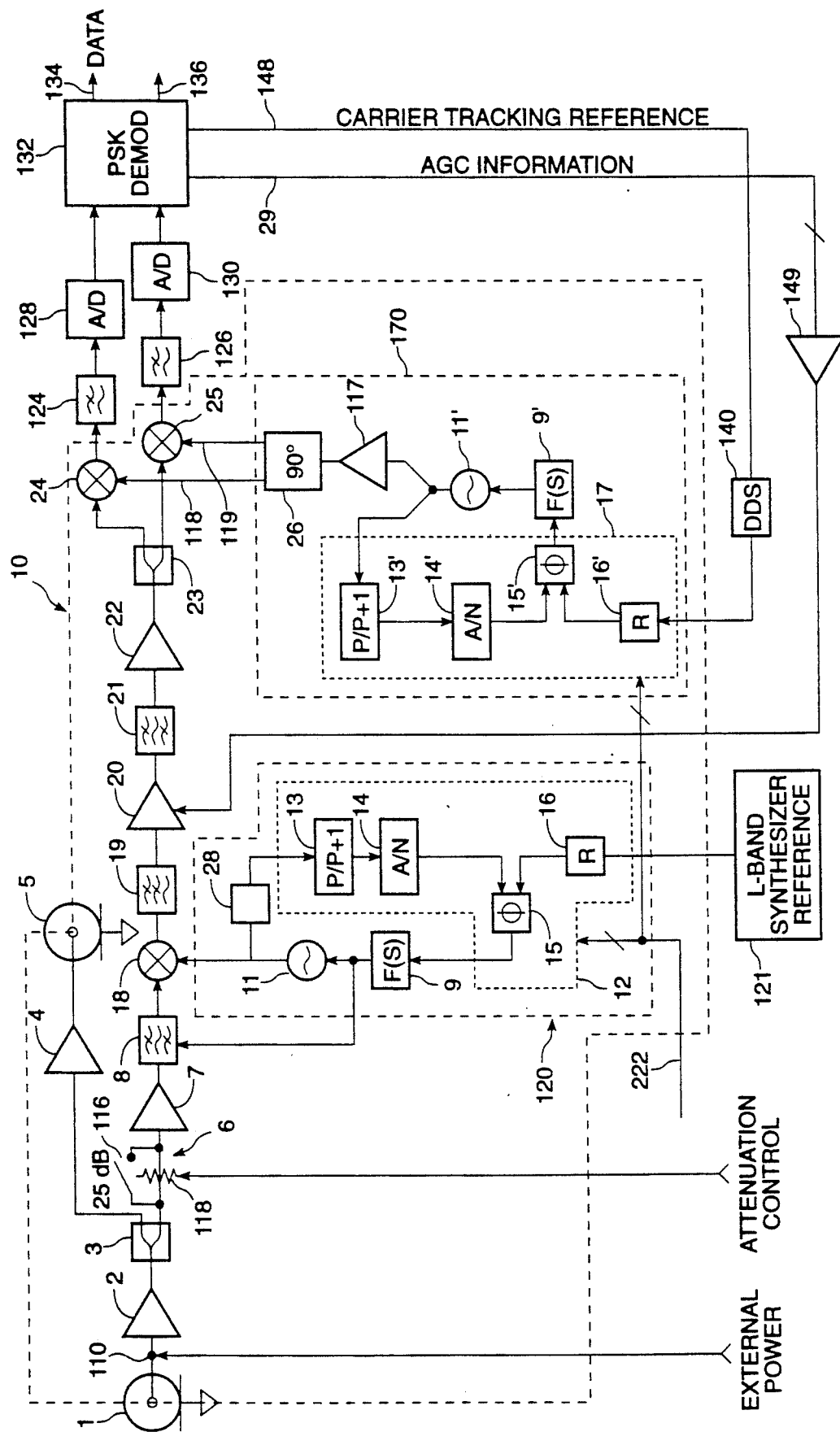
FIG. 2 is detailed block diagram of an L-band PSK tuner according to the invention.

Referring to FIG. 2, there is shown a device 10 according to the invention in greater detail. The numerals in FIG. 1 appear for the same elements in FIG. 2. Coupled to the input port 1 is a high-bandwidth amplifier 2. In the preferred embodiment amplifier 2 has a gain of 8 dB over the range 950 MHz to 1700 MHz and a noise figure of less than 6 dB. Power may be provided back to the LNB (not shown) via input port 1 through a tap 110 between the amplifier 2 and the input port 1 from an external power source (not shown).

The L-band signal through amplifier 2 is provided to a splitter 3 (having a loss of about 6 dB), where it is divided into identical signals, one to be processed in accordance with the invention and the other to an L-band tap comprising a buffer amplifier 4 and an output port 5 such as an F-type RF connector. The L-band tap allows other devices to be connected to the same signal receiving source.

The second leg of the splitter 3 is applied through an electronically controlled attenuator 6 comprising a bypass switch 116 and a resistive attenuator 118. Attenuation control (not shown) provides for selection of the resistive attenuator 118. The electronically switchable attenuator 6 has a nominal attenuation of either 0 dB or −22 dB which is chosen to be compatible with the input to the demodulator 132, in conjunction with ADC amplifier 20.

The output of the switched attenuator 6 is applied to a further amplifier 7 and thereby to a variable voltage-controlled filter 8. The amplifier 7 preferably has a gain of about 7 dB.

The variable voltage-controlled filter 8 serves as a preselector for the desired receive frequency and also serves to remove any image frequency of the input RF signal produced by the LNB (not shown) prior to further processing. The control voltage for the voltage variable-controlled filter 8 is derived from the VCO control voltage to a VCO 11 of the L-band synthesizer 120. In the preferred embodiment, the nominal filter insertion loss is 7 dB, with a tunable center frequency of 950 MHz to 1700 MHz and with a 3 dB bandwidth of greater than or equal to 20 MHz and a 40 dB bandwidth of less than or equal to 260 MHz.

In accordance with the invention, the L-band synthesizer 120 has voltage-controlled oscillator 11 which is set to the same receive signal frequency as the voltage-controlled variable filter 8+/− the IF center frequency so that the voltage-controlled variable filter 8 passes received signals in a passband matched to the synthesized signals of the L-band synthesizer while maintaining a relatively narrow bandwidth.

The L-band synthesizer 120 comprises a loop filter 9, a VCO 11, a PLL IC 12, and a prescaler 28. The PLL IC 12 comprises a dual modulus prescaler 13, a programmable swallow counter means 14, a phase detector 15 and a reference divider 16. The L-band synthesizer 120 produces an output frequency between 1090 MHz and 1840 MHz, corresponding to an input frequency of 950 MHz to 1700 MHz, in one MHz step increments. The output frequency is given by:

$$f_0 = 4 f_r (NP + A),$$

where
 $f_r$ is 0.25 MHz,
 N is a variable in an N register, called a programmable divider or preset divide factor register, between 34 and 57,
 P is 32, and
 A is a variable in an A register, called a swallow counter register, between 0 and 32.

The PLL IC 12 may be a Fujitsu Type MB1504 Serial Input Bi-CMOS PLL Frequency Synthesizer integrated Circuit made by Fujitsu Limited and Fujitsu Microelectronics, Inc. It is a serial input PLL with an on-chip 520 MHz two modulus prescaler. In this embodiment the P/P+1 value of the dual modulus prescaler 13 is set to 32/33, the R value of the reference divider 16 is set to 40, the A/N ratio of the programmable swallow counter means 14 is set by the programming source (microprocessor 122 of FIG. 1) to control the frequency. The serial data input 222 is used to program the internal divider. The PLL IC 12 may be programmed in general by an external control source such as a microprocessor (FIG. 1). The PLL IC 12 receives a reference frequency input from reference 121, such as a low-phase noise type signal (minimal phase variations) which can be fixed in frequency. The preferred reference frequency is 10 MHz from a crystal oscillator. The programming provides the variable automatic frequency control function. Typically, the L-band synthesizer 120 is permitted to tune in coarse frequency steps with remaining fine resolution occurring or provided by a subsequent stage.

The PLL IC 12 accepts a prescaled divide by four input from prescaler 28. The prescaler is for prescaling the L-band synthesizer output frequency to an input frequency at which the PLL IC 12 can operate. It receives a sine wave output from the VCO 11, limits it internally and reproduces a signal at ¼ the frequency of the input signal. The prescaler 28 may be a Type UPB585 Divide-by-4 Prescaler available from NEC of Tokyo, Japan. This device, which is operative at bandwidths up to 2.5 GHz, is especially designed for telecommunications applications.

The key to achieving the low phase noise in the L-band synthesizer 120 is to provide the PLL IC 12 with as low a Loop Divide Ratio as is possible while maintaining adequate step size resolution. A low Loop Divide Ratio minimizes reference phase noise multiplication and divider phase noise multiplication. Low Loop Divide Ratios result in coarser frequency resolution than is desired for tuning. However, commercially-available low-cost PLL ICs, such as those disclosed herein, are realized (constructed) with dual modulus prescalers which yield undesired high loop divide ratios. The inherent deficiencies are overcome with low-cost PLL ICs by designing a high divide ratio Phase Locked Loop, and setting loop bandwidth of the PLL low such that the phase noise of the L-band synthesizer 120 is determined primarily by the noise in the VCO 11, which is itself selected to be a very low noise oscillator. Such a design is contrary to the requirement of good microphonic performance. Microphonic performance is measured by checking for output errors due to phase slips in local oscillators as a consequence of mechanical vibrations. By good microphonic performance it is meant no phase slips in the presence of mechanical vibration of less than 0.9 Gs per the Specification RCTA/DO-160C SECTION 8, PROFILE B. Phase slips are caused by changes in the center frequency of a VCO resonator causing changes in the output frequency of the VCO. A large PLL loop bandwidth in comparison to VCO frequency deviations allows the use of the closed loop error signal to be applied to the VCO to correct frequency errors. However, where the PLL loop bandwidth is small, as is the case herein, the VCO output frequency is suspectable to mechanical vibration. Therefore, according to the invention, the VCO 11 is provided with a resonator 202 (FIG. 3) in the form of a microstrip which is only minimally susceptible to external mechanical vibration. The size of the entire structure including the microstrip, the oscillators and the mixer is about 3 cm by 5 cm and is on a single printed board.

Figure 3:
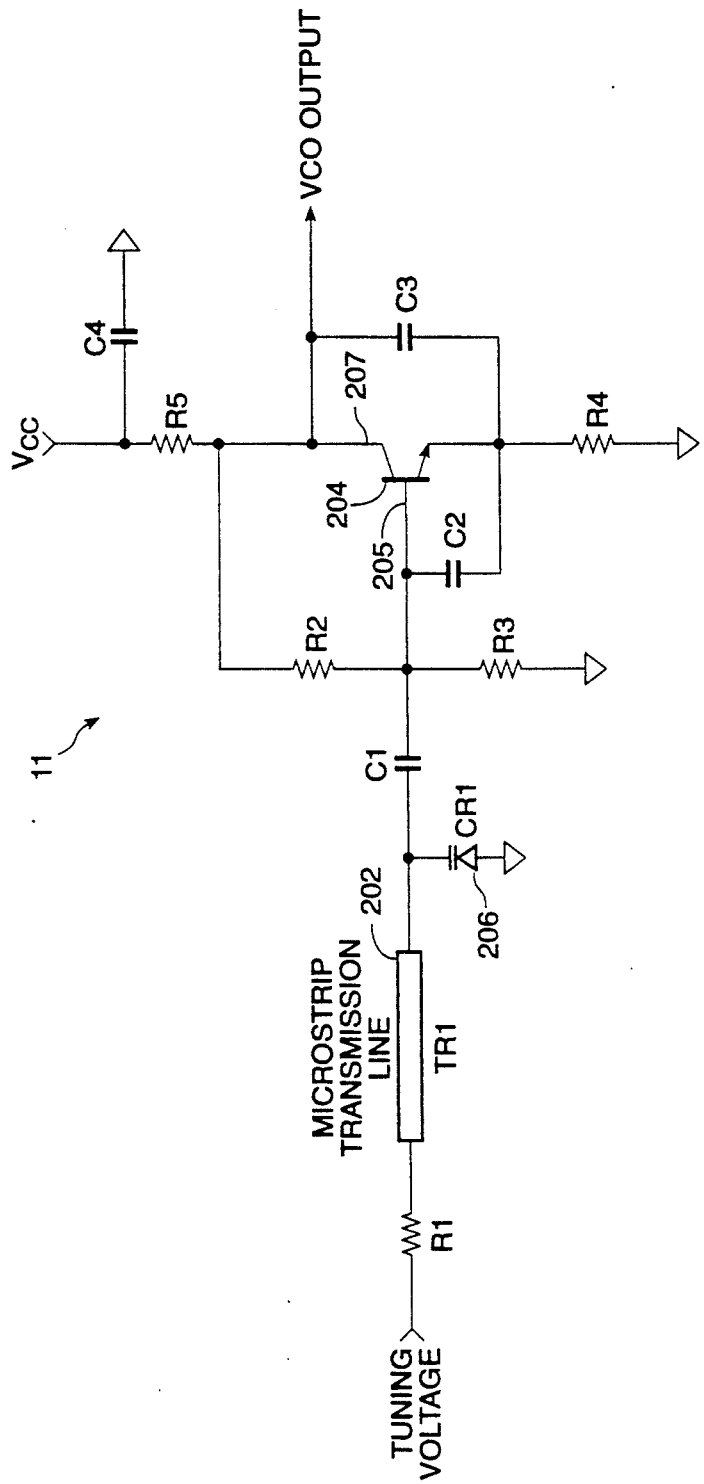
FIG. 3 is a schematic diagram of a voltage-controlled oscillator with a microstrip resonator.

In FIG. 3, a preferred embodiment of the VCO 11 is constructed around a single, high-frequency transistor 204. The transistor 204 is a.c. coupled through a capacitor C1 at its input 205 to receive a signal from the microstrip 202, the output of which is coupled across a varactor tuning diode 206. The input to the VCO 11 in the form of a tuning voltage signal is fed through an input resistor R1 to the microstrip 202. Input bias for the transistor 204 is provided by resistors R5, R2, R3 between Vcc and ground. Capacitors C2, C3 and C4 form an oscillator which is generally immune to parasitic oscillation. The VCO output is extracted from the collector 207 of the transistor 204. The microstrip resonator 202 is fabricated on a substrate in the form of a miniature transmission line-type delay element on a substrate. Resonance can be varied rapidly by means of the varactor diode.

Referring to FIG. 2, the loop filter 9 feeding the VCO 11 is a Type 3 active integrator which sets the PLL loop bandwidth to approximately 5 KHz. The VCO 11 in the preferred embodiment has a gain of 50 MHz per volt and is constructed with a microstrip rather than a wire inductor resonator to improve microphonic performance. The VCO is designed to the following phase noise requirements:

| Offset Frequency (KHz) | SSB Phase Noise (dBc/Hz) |
|---|---|
| 1 | −50 |
| 2 | −60 |
| 5 | −70 |
| 10 | −80 |

| Offset Frequency (KHz) | SSB Phase Noise (dBc/Hz) |
|---|---|
| 20 | −86 |
| 50 | −95 |
| 100 | −100 |

This design is consistent with achievement of good QPSK and BPSK performance.

The output of the loop filter 9 is provided as a control signal to the Voltage-controlled variable filter 8, and the output of the voltage controlled oscillator 11 is provided to mixer 18 where the signal is mixed with the output of the 20 voltage variable filter 8. The mixer 18 is an active single balanced type mixer with approximately 3 dB of conversion gain. It accepts local oscillator input between 1090 MHz and 1840 MHz from the L-Band synthesizer 120 and programmably filtered RF input between 950 MHz and 1700 MHz from filter 8 to produce a 140 MHz IF signal.

The mixer 18 produces an upper sideband, a lower sideband and a local oscillator signal. The upper sideband and local oscillator leakage signals are low-pass filtered in a low-pass filter 19. The resulting lower sideband is the IF signal. The IF signal is provided to an AGC amplifier 20 where automatic gain control is introduced under control of an AGC voltage. The AGC amplifier 20 is designed to have approximately 50 dB of dynamic range. In conjunction with attenuator 6, over 70 dB dynamic range can be achieved. However, the AGC amplifier 20 must have a flat frequency response of +/−10 MHz at the 140 MHz IF frequency.

The output of the AGC amplifier 20 is fed to a bandpass filter 21. The bandpass filter 21 is preferably a lumped LC bandpass filter centered on the IF frequency with a one dB bandwidth of 20 MHz. The output of bandpass filter 21 is fed to an intermediate frequency (IF) amplifier 22. IF amplifier 22 is a 20 dB fixed-gain amplifier with a flat response in the IF frequency range. The output of the IF amplifier 22 is split into two channels by a zero-phase splitter 23 where the first signal feed is fed to first mixer 24, and the second signal feed is fed to second mixer 25. The first and second mixers 24, 25 are driven by local oscillator signals from the IF PLL circuitry 170, and in particular, by a quadrature splitter 26. The quadrature splitter 26 is a 90-degree phase splitter creating two identical signals from a single signal source, which in this case may be an amplifier 117 The IF PLL circuitry 170 employs a VCO 11' a loop filter 9', and an IF PLL IC 17 The functions of the loop filter 9' and VCO 11'are similar to those previously recited.

The PLL IC 17 may be a Fujitsu Type MB87014A CMOS PLL Frequency Synthesizer/Prescaler integrated circuit made by Fujitsu Limited and Fujitsu Microelectronics, Inc. It is a serial input PLL with an on-chip 180 MHz dual modulus prescaler. The PLL IC 17 may be programmed by an external microprocessor 122 It employs a dual modulus prescaler 13', a programmable swallow counter means 14', a phase detector 15', and a reference divider 16'. A divide ratio of 64 is achieved by setting the N register to 5, the A register to 0 and the R register to 5. The output is 140 MHz, +/−10 MHz, and it is locked to an IF input reference frequency from DDS 140 of 2.1875 MHz, +/−156.250 KHz. The loop filter 9' is of the same type as loop filter 9, except that the loop bandwidth is designed to be 60 KHz. As a result the phase noise is −60 dBc/Hz at 100

Hz offset to −90 dBc/Hz at 100 KHz offset. In contrast to the L-Band synthesizer 120, the IF PLL 170 has a fixed multiply ratio, and its output is tuned by providing a variable frequency reference (140) to the input. This variable frequency reference is derived from the output of the demodulator 132 (e.g., through the DDS 140) and is a closed loop error signal used to track the L-band input signal to the tuner. The IF PLL loop bandwidth is about 60 to 70 KHz in order to be much larger than the carrier tracking loop bandwidth (the loop comprising the IF synthesizer and the demodulator), and the phase noise is inherently better, as the multiply ratio is smaller. The high IF frequency of 140 MHz provided adequate image rejection while minimizing the effects of spurious multiplication in the IF PLL 170.

Output of the baseband I and Q signals is provided to the demodulator IC 132 through the filters 124, 126 and A/D converters 128, 130, respectively. AGC voltage is extracted from information derived from the PSK demodulator IC 132 on AGC information line 29 directed to an agc voltage converter 149. Excellent dynamic tracking can therefore be achieved.

The circuitry, and specifically all circuitry up to the analog inputs to the filters preceding the PSK demodulator IC 132, is preferably contained in a single shielded enclosure, thus providing a single, low-cost, highly-reliable modular product. No external manual adjustments are required for this component. Channel selection is by means of simple input signals from for example the microprocessor system 122 via signal lines 222 to the L-band synthesizer 120 and the IF PLL 170, but the signals are not in the nature of circuit adjustments. Outputs are the original analog L-band signal and I and Q analog data signals, suitable for decoding in connection with a digital direct broadcast system. More preferably, the entire apparatus is contained within a single shielded enclosure whereby all control signals, with the possible exception of digital input to select frequency of interest, are contained within a single unit. The digital data signals derived from either BPSK or QPSK format may be provided directly to a digital output device.

The invention has now been explained with reference to specific embodiments. Other embodiments will be apparent to those of ordinary skill in the art. For example, the invention is not limited to use with L-band downconverters. Other downconverters could be used, such as UHF downconverters. It is therefore not intended that this invention be limited except as indicated by the appended claims.

What is claimed is:

1. An apparatus for converting RF PSK modulated signals to baseband signals, said apparatus comprising:
   means for receiving an RF input signal;
   local oscillator means for producing a low phase noise local oscillator signal with good microphonic performance, said local oscillator means including a microstrip resonator substantially immune to mechanical vibration and having as a current delay element a microstrip transmission line forming a delay line and operative to apply a tuning voltage across a varactor diode through said microstrip transmission line;
   means coupled to said receiving means and to said local oscillator means for mixing the RF input signal over a range of frequencies with the low phase noise local oscillator signal to obtain an IF signal at an IF frequency of sufficient bandwidth and of sufficient quality to allow extraction of digital data; and
   means coupled to receive said IF signal for extracting an in-phase (I) signal and a quadrature-phase (Q) signal at baseband for use in digitally demodulating the I signal and the Q signal,
   said receiving means, said local oscillator means, said mixing means and said extracting means being in a single component which has no requirement for externally-applied signal adjustment except frequency and signal level selection.

2. The apparatus according to claim 1 further including means for demodulating said I signal and said Q signal to yield data-producing signals, said demodulating means including means for generating a carrier tracking reference signal for tuning said extracting means.

3. The apparatus according to claim 1 wherein said extracting means comprises an IF phase locked loop (IF PLL) frequency synthesizer having a phase locked loop with a loop bandwidth sufficient for tracking a varying carrier signal of a digital signal within its loop bandwidth, for producing a variable reference signal in response to a variable frequency control input, and a quadrature splitter coupled to output of said IF PLL frequency synthesizer for separating the IF PLL frequency synthesizer output into an in-phase local oscillator signal and a quadrature phase local oscillator signal.

4. An apparatus for converting RF PSK modulated signals to baseband signals, said apparatus comprising:
   means for receiving an RF input signal;
   local oscillator means for producing a low phase noise local oscillator signal with good microphonic performance, said local oscillator means including a microstrip resonator substantially immune to mechanical vibration and having as a current delay element a microstrip transmission line forming a delay line and operative to apply a tuning voltage across a varactor diode through said microstrip transmission line, said local oscillator means comprising a low loop bandwidth phase locked loop synthesizer having a voltage controlled oscillator with fine frequency resolution, the loop bandwidth being sufficiently small such that noise effects of said local oscillator means are dominated by the voltage controlled oscillator;
   means coupled to said receiving means and to said local oscillator means for mixing the RF input signal over a range of frequencies with the low phase noise local oscillator signal to obtain an IF signal at an IF frequency of sufficient bandwidth and of sufficient quality to allow extraction of digital data; and
   means coupled to receive said IF signal for extracting an in-phase (I) signal and a quadrature-phase (Q) signal at a baseband for use in digitally demodulating the I signal and the Q signal.

5. The apparatus according to claim 4 wherein said receiving means, said local oscillator means, said mixing means and said extracting means are in a single component forming a printed circuit board such that said component has no requirement for externally-applied signal adjustment except channel selection.

6. The apparatus according to claim 4 further including means for demodulating said I signal and said Q signal to yield data-producing signals, said demodulating means including means for generating a carrier tracking reference signal for tuning said extracting means.

7. The apparatus according to claim 6 wherein said receiving means, said local oscillator means, said mixing means and said extracting means are in a single component forming a printed circuit board such that said component has no requirement for externally-applied signal adjustment except channel selection.

8. An apparatus for converting RF PSK modulated signals to baseband signals, said apparatus comprising:
   means for receiving an RF input signal;
   local oscillator means for producing a low phase noise local oscillator signal with good microphonic performance, said local oscillator means comprising a low loop bandwidth phase locked loop synthesizer having a voltage controlled oscillator with fine frequency resolution, the loop bandwidth being sufficiently small such that noise effects of said local oscillator means are dominated by the voltage controlled oscillator, wherein said low loop bandwidth phase locked loop synthesizer of said local oscillator means has a phase locked loop realized with a high loop divide ratio and a low loop bandwidth such that the loop divide ratio of said phase locked loop is less than is suited for its intended tuning range so that phase noise is determined primarily by noise of the low noise voltage controlled oscillator, and further including a microstrip resonator substantially immune to mechanical vibration to attain the good microphonic performance;
   means coupled to said receiving means and to said local oscillator means for mixing the RF input signal over a range of frequencies with the low phase noise local oscillator signal to obtain an IF signal at an IF frequency of sufficient bandwidth and of sufficient quality to allow extraction of digital data; and
   means coupled to receive said IF signal for extracting an in-phase (I) signal and a quadrature-phase (Q) signal at a baseband for use in digitally demodulating the I signal and the Q signal.

9. The apparatus according to claim 8 wherein voltage controlled oscillator with said microstrip resonator comprises a single-transistor oscillator having as a current delay element a microstrip transmission line forming a delay line and operative to apply a tuning voltage across a varactor diode through said microstrip transmission line into a capacitive input to the single transistor.

10. The apparatus according to claim 8 further including gain control means coupled between the IF signal output of said mixing means and input of said extracting means, said gain control means having a substantially flat frequency response over frequency range of said IF signal, said demodulating means generating automatic gain control information for said gain control means in order to permit said gain control means to maintain gain within tolerance for digital demodulation.

11. An apparatus for converting RF PSK modulated signals to baseband signals, said apparatus comprising:
    means for receiving an RF input signal;
    local oscillator means for producing a low phase noise local oscillator signal with good microphonic performance,
    wherein local oscillator means comprises a low loop bandwidth phase locked loop synthesizer having a voltage controlled oscillator, said phase locked loop synthesizer having a phase locked loop realized with a high loop divide ratio and a low loop bandwidth such that the loop divide ratio of said phase locked loop is less that is suited for its intended tuning range so that phase noise is determined primarily by noise of the low noise voltage controlled oscillator;
    said local oscillator means comprising a low loop bandwidth phase locked loop synthesizer having a voltage controlled oscillator with fine frequency resolution, the loop bandwidth being sufficiently small such that noise effects of said local oscillator means are dominated by the voltage controlled oscillator;
    means coupled to said receiving means and to said local oscillator means for mixing the RF input signal over a range of frequencies with the low phase noise local oscillator signal to obtain an IF signal at an IF frequency of sufficient bandwidth and of sufficient quality to allow extraction of digital data; and
    means coupled to receive said IF signal for extracting an in-phase (I) signal and a quadrature-phase (Q) signal at a baseband for use in digitally demodulating the I signal and the Q signal.

12. The apparatus according to claim 10 wherein said phase locked loop synthesizer means includes a phase detector to detect phase error and a loop filter to produce a phase error-based control signal, said apparatus further including a voltage variable tunable bandpass filter means between said RF signal receiving means and said mixing means to track the RF signal in response to said phase error-based control signal.

* * * * *